(12) United States Patent
Massey et al.

(10) Patent No.: US 6,616,736 B2
(45) Date of Patent: Sep. 9, 2003

(54) AIR PURIFIER

(75) Inventors: Arthur Massey, Collierville, TN (US); Larry S. Bias, Bartlett, TX (US); Francisco J. Carbajal, Cordova, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/758,983

(22) Filed: Jan. 16, 2001

(65) Prior Publication Data

US 2001/0029728 A1 Oct. 18, 2001

Related U.S. Application Data

(60) Provisional application No. 60/177,973, filed on Jan. 25, 2000.

(51) Int. Cl.$^7$ .................................................. B03C 3/36
(52) U.S. Cl. ...................... 96/25; 95/26; 96/63; 96/424; 96/26
(58) Field of Search ............................... 96/25, 63, 424, 96/FOR 167, 255, 115, 116, 103, 117, 26; 95/26

(56) References Cited

U.S. PATENT DOCUMENTS

| | | | | |
|---|---|---|---|---|
| 3,398,510 A | * | 8/1968 | Pennington | 96/115 |
| 3,812,370 A | * | 5/1974 | LaViolette | 96/116 X |
| 4,244,712 A | * | 1/1981 | Tongret | 96/25 |
| 4,268,285 A | * | 5/1981 | Mason | 96/424 X |
| 4,786,295 A | * | 11/1988 | Newman et al. | 96/424 X |
| 4,792,345 A | * | 12/1988 | Abe et al. | 96/424 X |
| 5,329,991 A | | 7/1994 | Mehta et al. | 165/12 |
| 5,656,063 A | * | 8/1997 | Hsu | 96/25 X |
| 5,782,296 A | | 7/1998 | Mehta | 165/268 |
| 5,800,583 A | * | 9/1998 | Pippel et al. | 96/424 X |
| 5,925,172 A | * | 7/1999 | Rick et al. | 96/424 X |
| 5,937,942 A | | 8/1999 | Bias et al. | 165/238 |
| 5,957,374 A | | 9/1999 | Bias et al. | 236/78 |
| 6,036,757 A | * | 3/2000 | Gatchell et al. | 96/424 |

* cited by examiner

*Primary Examiner*—Richard L. Chiesa
(74) *Attorney, Agent, or Firm*—Baker Donelson

(57) ABSTRACT

An air purifier (10) is provided having a housing (11) having a grilled air inlet (12), a grilled air outlet (13), and a control panel (14). The air purifier (10) also includes a pre-filter (16), a main filter (17), a blower (18) and a controller (19), all mounted within the housing (11). The controller (19) has a central processing unit having a permanent memory for storing the program instructions for operation and control of the air purifier, a working memory, and a non-volatile memory for the permanent storage of programs and counters. The controller is programmable so as to control the operation of the blower according to time and speed parameters entered into memory.

9 Claims, 3 Drawing Sheets

AIR PURIFIER

REFERENCE TO RELATED APPLICATION

This is a continuation-in-part of U.S. Provisional Patent Application Ser. No. 60/177,973 filed Jan. 25, 2000.

TECHNICAL FIELD

This invention relates to air purifiers, and specifically to automated air purifiers.

BACKGROUND OF THE INVENTION

Air purifiers have grown in popularity in recent years. A growing concern for health and an increased recognition of the risks associated with unclear air are largely responsible for this trend. For example, airborne pollutants can cause or contribute to a number of respiratory problems, including respiratory infections, asthma, and allergies. Additionally, some airborne pollutants can cause undesirable odors. While air purifiers are available in a wide variety of designs, a conventional air purifier includes a blower that moves air through a filter element. The blower and filter element are typically contained in a unitary housing and are arranged with the blower either drawing or pushing air through the filter element. A number of different filter elements with different filtering characteristics are commercially available. For example, particulate filters are available to remove particulate matter from air. A conventional particulate filter includes a substance, such as fiberglass or electret-type media, that traps particulate matter as air is passed therethrough. Another example, odor filters are available to remove odors from the air. A conventional odor filter includes activated carbon, or activated charcoal, which removes pollutants from the air primarily by absorption.

Conventional air purifiers suffer from a number of problems. These systems are inherently noisy. The sound of air moving through the system and the noise generated by the blower motor are primary contributors to the noise level of the system. The noise level of the air passing through the purifier may be reduced by lowering the velocity at which it moves through the housing and filter. This can be done by increasing the size of the air flow path or by lowering the volume of air moved through the system. Increasing the air flow path requires larger housings and therefore increasing the overall size of the purifier.

To control the velocity of the air through the purifier they typically have a manual control for the user to select a desired speed for the fan motor. Generally, a high fan speed passes a larger volume of air through the unit so as to quickly and effectively remove airborne particles from the air. These high fan speeds however create an undesirable noise level. Because of these noise problems users often utilize the air purifier at a lower fan speed, especially when the user is attempting to sleep. These low fan speeds however do not maximize the purification capabilities of the unit. Many users however do not change the fan speed so that the purifier may be utilized at a maximum level of performance at times when the user is not present.

Air purifiers have been designed to include a timing mechanism to energize the fan motor for a select period of time, such as one, two or four hours, from the initial, manual actuation of the timing mechanism. These air purifiers however operate for only that select period of time commencing at the time the operator initiates the operation.

Air purifiers have also been designed to include an automatic control system which energizes or de-energizes the unit based on the sensed measured quality of air about the unit. These units however operate at a maximum fan speed at all times under certain conditions. As such, the unit may have a lifespan which is greatly decreased due to its overuse and the unit may operate at a high speed when such is not desired due to the noise factor.

Accordingly, it is seen that a need remains for an automatic air purifier which overcomes these problems associated with the prior art. It is to the provision of such therefore that the present invention is primarily directed.

SUMMARY OF THE INVENTION

In a preferred form of the invention an air purifier comprises, in combination, a housing having an air inlet and an air outlet, a filter mounted within the housing between the air inlet and the air outlet, fan means for drawing air into the housing through the air inlet, through the filter and out of the housing through the air outlet, motor means for driving the fan means at a plurality of discrete speeds, and programmable control means for automatically operating the motor means at different speeds during different daily periods of time.

DETAILED DESCRIPTION

Figure 2:
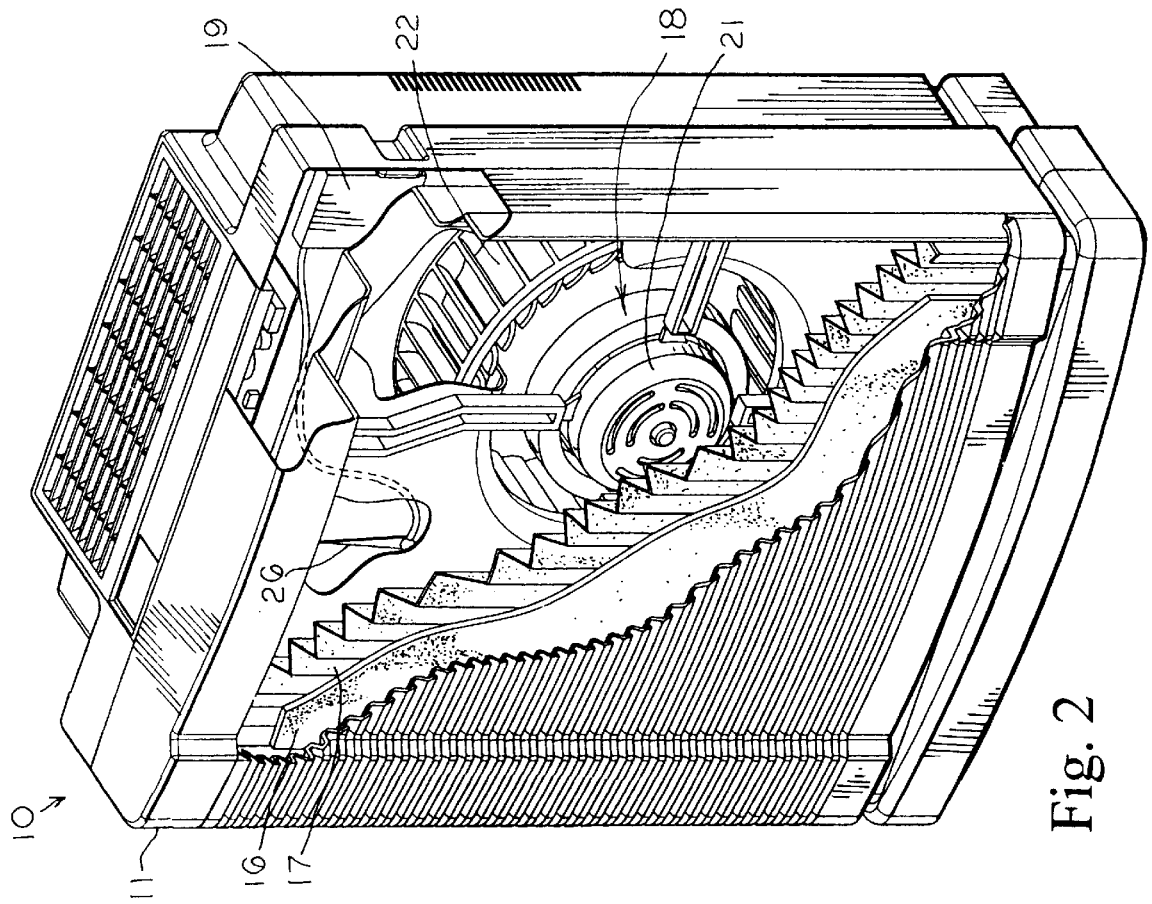
FIG. 2 is a perspective view of the air purifier of FIG. 1 shown in partial cross-section.
Figure 1:
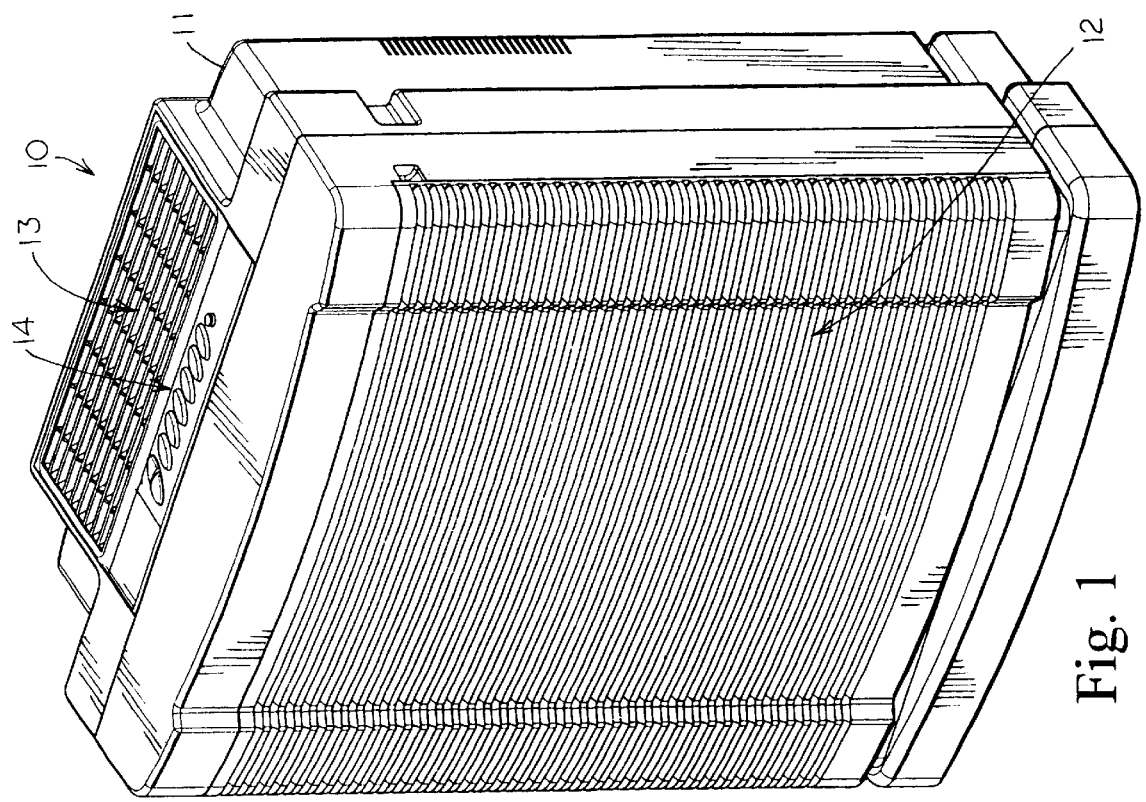
FIG. 1 is a perspective view of an air purifier embodying principles of the invention is a preferred form.

With reference next to the drawings, there is shown an air purifier 10 in the form of a portable, self-standing unit. The air purifier 10 has a housing 11 having a grilled air intake 12, a grilled air outlet 13, and a control panel 14. The air purifier 10 also includes a replaceable pre-filter 16, a replaceable main filter 17, a blower 18 and a controller 19, all mounted within the housing 11. The blower 18 has a variable speed electric motor 21 coupled to a fan 22. An a.c. power supply is coupled to the motor 21 through a conventional, unshown electric power cord which is coupled to a d.c. power supply 25. The d.c. power supply 25 is also coupled to the controller 19 and to an optional ionizer needle 26.

The controller 19 itself has a microprocessor or central processing unit (CPU) having a permanent memory such as a read only memory (ROM) for storing the program instructions for operation and control of the air purifier, a working memory or random access memory (RAM), and a non-volatile memory or electronically erasable programmable read only memory (EEPROM) for permanent storage of programs and counters. A set of pre-programmed or default times and fan speed selections (low, medium and high) are entered into the permanent memory. For exemplary purposes only, the pre-programmed setting may include a first program commencing at 8:00 a.m. having a fan speed of medium, a second program commencing at 3:00 p.m. having a fan speed of high, a third program commencing at 5:00 p.m. having a fan speed of medium, and a fourth program commencing at 10:00 p.m. having a fan speed of low. Additionally, the program may include multiple days so that different days have different scheduled programs or different groupings of days such as the same set of programs for Monday through Friday and a different set of programs for Saturday and Sunday.

Figure 3:
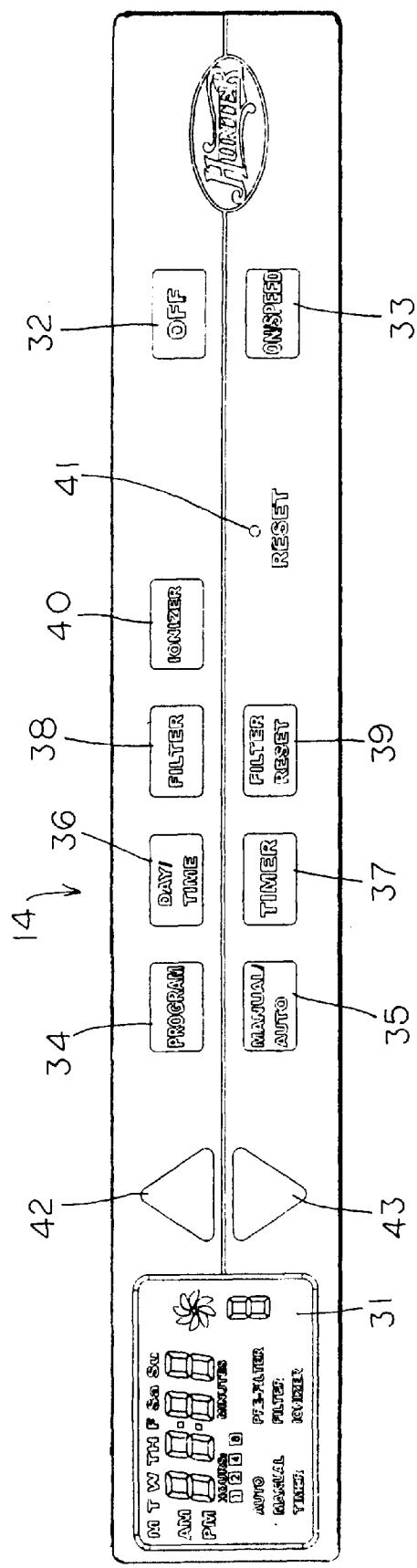
FIG. 3 is a top view of a control panel of the air purifier of FIG. 1.
Figure 4:
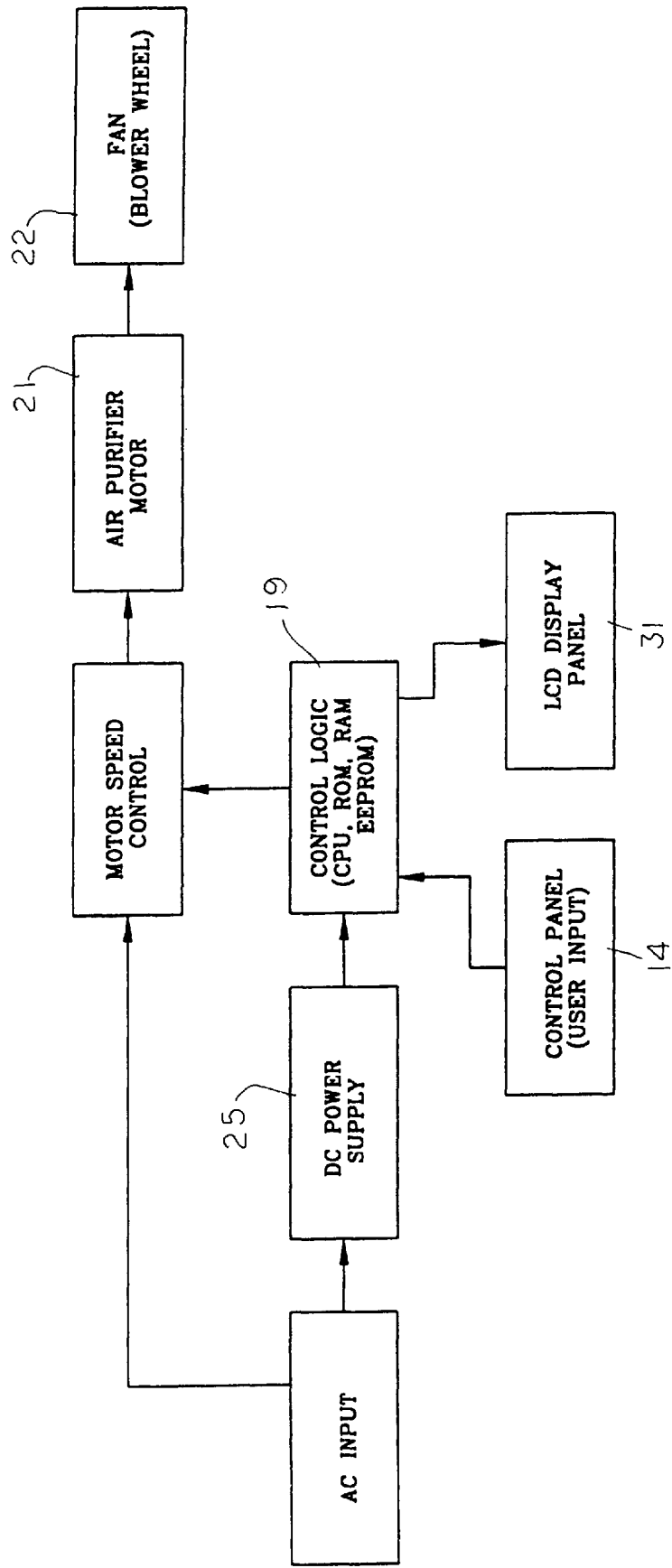
FIG. 4 is a block diagram of the components of the air purifier of FIG. 1.

With reference next to FIG. 3, the control panel 14 includes a display panel 31, an off key 32, an on/speed key 33, a program key 34, a manual/auto key 35, a day/time key 36, a timer key 37, a filter key 38, a filter reset key 39, an ionizer key 40, a reset button 41, an up key 42 and a down key 43. All keys are coupled to the controller 19. The display panel 31 is a liquid crystal display that shows the current day, current time, the auto or manual mode of operation, current program number, current fan speed, an ionizer operational indicator. The display panel 31 may also display the number of run hours, timer hours and minutes remaining, and pre-filter and main filter change notifications. The off key 32 manually turns off the air purifier while the on/speed key 33 manually turns on the air purifier and cycles through the blower speeds (low, medium and high). The program key 34 enters the program mode into the controller. The manual/auto key 35 causes the controller 19 to switch between manual control and automatic control based on the programmed times and speeds. The day/time key 36 enters a clock set signal to the controller 19. The timer key 37 enters a set number of run time hours (one hour, two hours, four hours) into the controller 19. The filter key 38 displays the number of hours the purifier has been utilized subsequent to the last filter change. The filter reset key 39 resets the filter time counter since the last filter change. The ionizer key 40 enters a signal to the controller 19 of whether or not to energize the ionizing needle 26. The reset button 41 resets the controller microprocessor, which in turn resets the clock, filter counters and blower to their default settings.

In use, an operator enters the current time and day of the week into the controller memory utilizing the control panel keys in the following manner. The operator presses the day/time key 36 to enter the clock setting mode. The LCD display panel 31 shows the hour segments flashing to indicate that they may now be changed. By pressing the up key 42 or down key 43 the current hour setting is changed. This process is repeated for the minute segments and day segments.

In a preferred form of the invention the air purifier operates in the same programmed manner Monday through Friday and in another programmed manner Saturday and Sunday. It should be noted however that the present invention may also be programmed to operate in the same manner all days of the week or in a programmed manner which changes with each day of the week.

In re-programming the controller 19 to setting different from the initial, pre-set setting the operator presses the program key 34 to enter the program mode. The LCD display panel 31 shows the current setting for Program 1. Utilizing the previous example, Time=8:00 a.m. and Fan Speed=Medium. The LCD display panel shows the hour segments flashing to indicate that they may be changed. The operator then presses the up key 42 or down key 43 to reset the hour setting to the desired hour. This procedure is repeated to change the minute setting, fan speed setting, and optional ionizer setting for Program 1. This process is also repeated to reset any of the other program settings, i.e. Program 2, Program 3, or Program 4.

If a operator wishes to return the air purifier settings to their initial, preset programs the Reset button 41 is pressed, which causes the controller to reset the programs to their preset settings.

With the operation of the air purifier, the blower is driven to draw air into the air inlet 12, through the pre-filter 16, through the main filter 17 and through the air outlet 13. The ionizer needle 26 helps to increase the performance of the air purifier by generating negatively charged ions that attract positively charged smoke and dust particles present within the air.

The air purifier may be operated in either a manual mode wherein the blower speed is constant for a select time period or until it is manually changed through operation of the control panel keys or an automatic mode wherein the blower is controlled by the controller 19. With continued reference to the previous example of the automatic mode of operation at a location assumed to be the operator's home is described as follows, as the current time within the controller 19 reaches 8:00 a.m. the controller 19 sets the speed of the blower 18 to its medium setting, which is intended to correlate to the time one normally leaves for work during the workweek. The air purifier operates at its medium setting until 3:00 p.m., wherein the air purifier's blower 18 is accelerated by the controller 19 to its high setting. The blower 18 is set to high setting to correlate its operation at a maximum in the absence of the operator and immediately prior to the operators return from work. The controller 19 reduces the speed of the blower 18 back to its medium setting at 5:00 p.m. so that the air purifier's operation and inherent noise level is reduced at the time the operator returns to the location of the air purifier. The controller 19 again reduces the speed of the blower 18 to its low setting at 10:00 p.m. so that the air purifier's operation and inherent noise level is reduced to its minimal level about the time the operator commences to sleep.

As such, it should be understood that the present invention enables an air purifier to be operated at different speeds throughout the day in an automatic manner. This enables the air purifier to be programmed to operate at its highest yet noisiest level when people are not present. Additionally, this enables the air purifier to be programmed to operate at its lowest yet quietest level when people are attempting to sleep.

It should be understood that as an alternative to the filter shown in the preferred embodiment, the filter may be in the form of electrostatic plates or other conventionally known filtering devices. It should also be understood that the variable speed motor may include any motor or motor and controller combination which enables it be driven at different speeds through either mechanical means or changes in the electric current.

It thus is seen that an air purifier is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. An air purifier comprising, in combination, a housing having an air inlet and an air outlet, a filter mounted within said housing between said air inlet and said air outlet, fan means for drawing air into said housing through said air inlet, through said filter and out of said housing through said air outlet, motor means for driving said fan means at a plurality of discrete speeds, and programmable control means for storing a plurality of preselected motor speeds and a plurality of preselected daily periods of time and automatically operating said motor means at different preselected speeds during different preselected daily periods of time.

2. The air purifier of claim 1 wherein said programmable control means automatically operates said motor means at different speeds during different daily periods of time for different days of the week.

3. The air purifier of claim 1 further comprising ionizing means for ionizing air passing through said air purifier, and wherein said control means also controls the automatic operation of said ionizing means.

4. An air purifier comprising:
   a housing having an air inlet and an air outlet;
   a variable speed electric motor;
   a fan coupled to said electric motor;
   an air filter mounted to extract impurities from an airstream passing from said air inlet to said air outlet; and
   a controller having means for maintaining the current time, first memory means for storing a plurality of select programmable time intervals, second memory means for storing a plurality of select fan speeds associated with each said time interval, and means for automatically operating said electric motor during said select time intervals stored within said first memory means at said associated selected fan speed stored within said second memory means as the current time correlates to the time interval stored within said first memory means,
   whereby the air purifier may be programmed to automatically operate the electric motor at different select speeds during different time intervals throughout a day.

5. The air purifier of claim 4 wherein said controller automatically operates said motor means at different speeds during different daily periods of time for different days of the week.

6. The air purifier of claim 4 further comprising ionizing means for ionizing air passing through said air purifier, and wherein said controller also controls the automatic operation of said ionizing means.

7. An air purifier comprising, in combination, a housing having an air inlet and an air outlet, a filter mounted within said housing between said air inlet and said air outlet, blower means for drawing air into said housing through said air inlet, through said filter and out of said housing through said air outlet, said blower means being capable of being driven at a plurality of discrete speeds, motor means for driving said blower means at said plurality of discrete speeds, and programmable control means for storing a plurality of preselected motor speeds and a plurality of preselected daily periods of time and automatically operating said motor means at different preselected speeds during different preselected programmed daily periods of time.

8. The air purifier of claim 7 wherein said programmable control means automatically operates said blower means at different speeds during different daily periods of time for different days of the week.

9. The air purifier of claim 7 further comprising ionizing means for ionizing air passing through said air purifier, and wherein said control means also controls the automatic operation of said ionizing means.

* * * * *